United States Patent Office 3,461,969
Patented Aug. 19, 1969

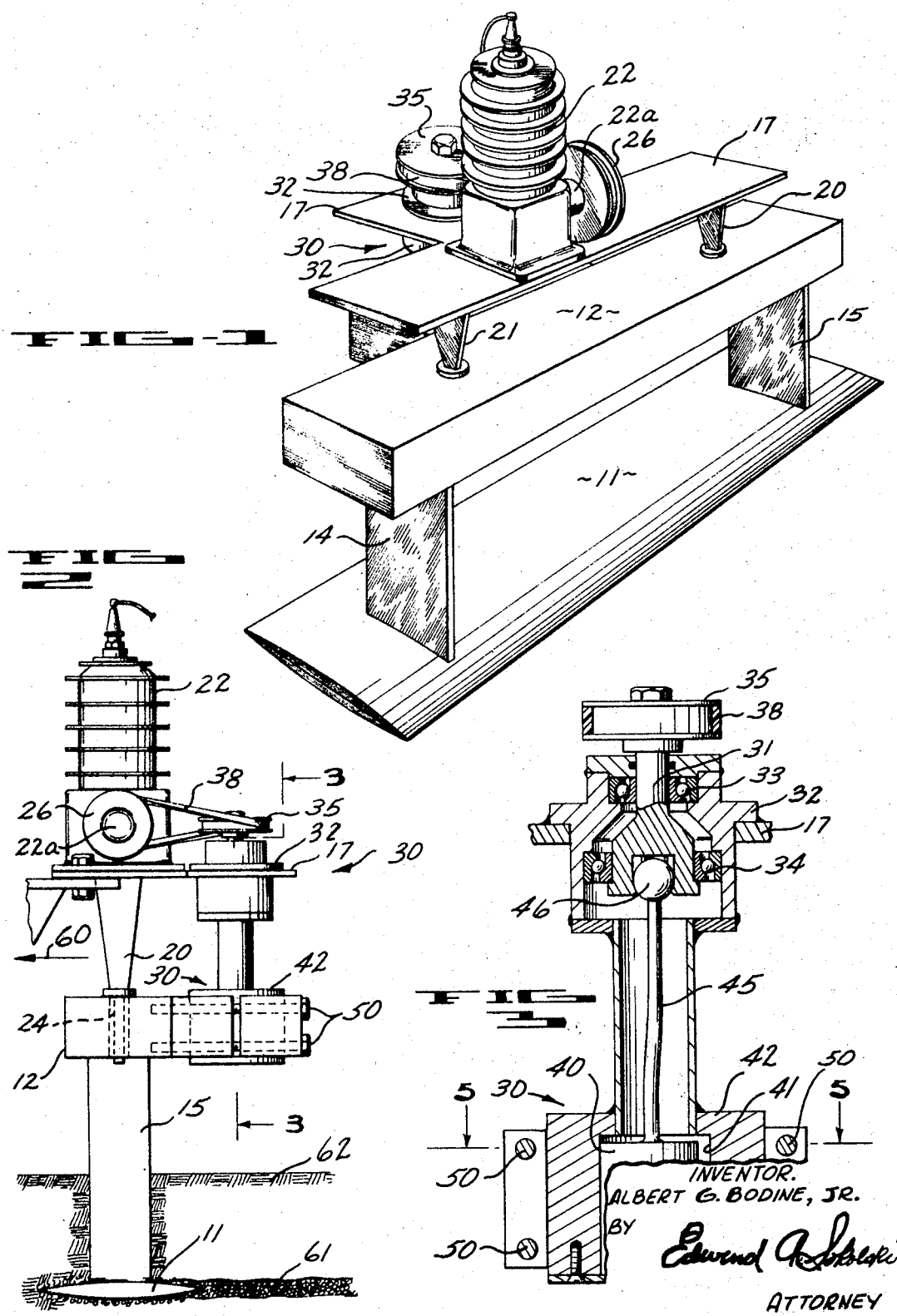

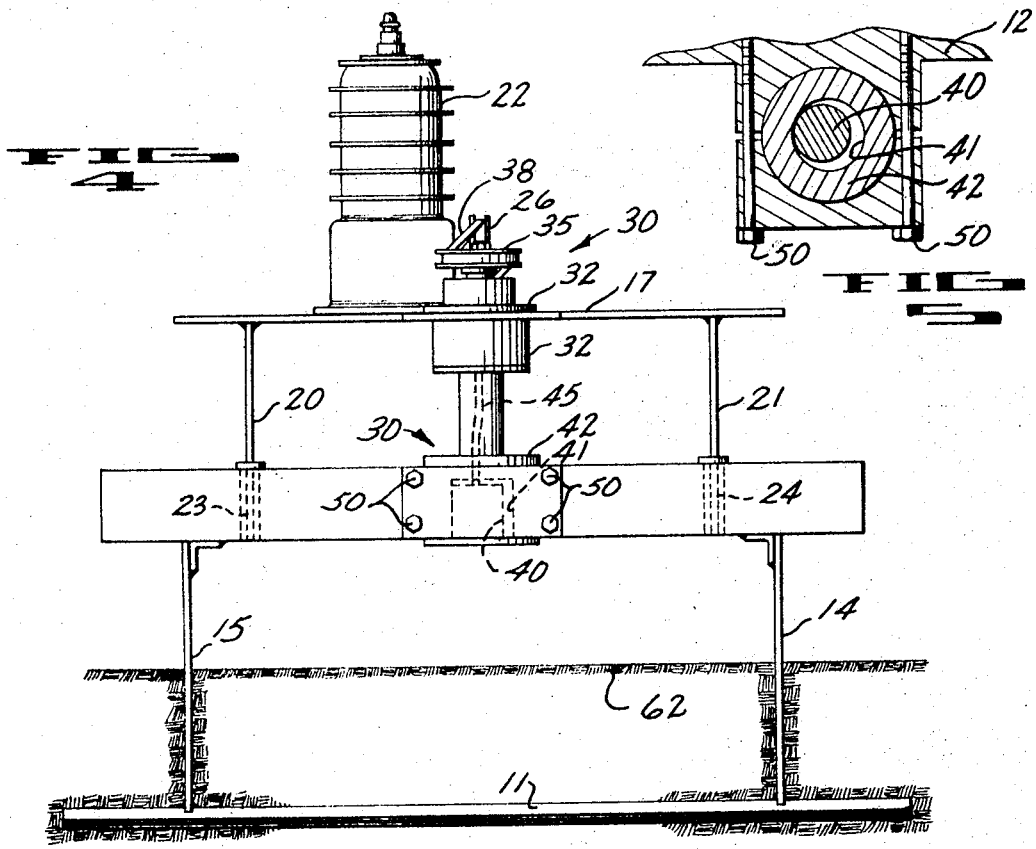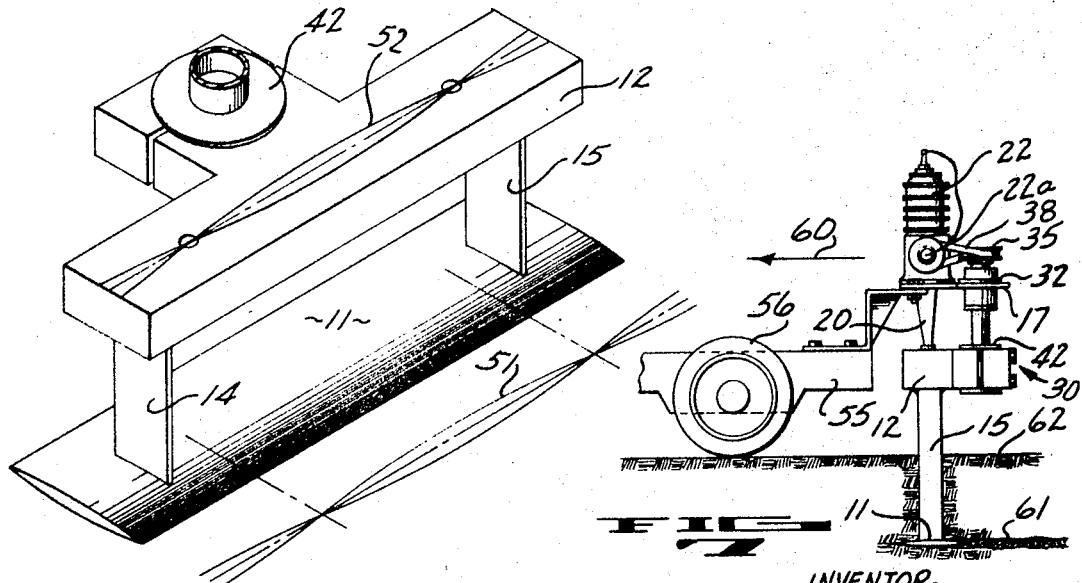

3,461,969
SONIC SUBSURFACE SOIL CULTIVATOR
Albert G. Bodine, Jr., 7877 Woodley Ave.,
Van Nuys, Calif. 91406
Filed May 20, 1966, Ser. No. 551,628
Int. Cl. A01b 79/00, 35/02
U.S. Cl. 172—1                                        8 Claims

ABSTRACT OF THE DISCLOSURE

A substantially flat blade member, the broad surfaces of which are oriented horizontally, is positioned in the soil a short distance below the surface thereof by means of relatively flat arm members which extend through the surface of the soil. An elastic bar member interconnects the arm members where they extend out of the soil. The bar member and blade member are sonically energized by means of an orbiting mass oscillator and are caused to elastically vibrate at a resonant vibration frequency. While such sonic resonant vibration is occurring, the blade member is drawn horizontally through the earth to fluidize a swath of earth a short distance below the surface without significantly tilling the earthen material at and immediately adjacent to the surface.

---

This invention relates to a sonic substance soil cultivator and more particularly to a method and apparatus for sonically fluidizing the soil a short distance below the surface while leaving the surface soil substantially intact.

In my Patent No. 3,231,025, entitled Sonic Soil Cultivator, issued Jan. 25, 1966, a device is described for cultivating agricultural soil by coupling sonic energy to the soil to cause the fluidization thereof. The apparatus described in the aforementioned patent results in the efficient cultivation of the soil at the surface and a short distance therebelow. In certain situations, the tearing up of the soil at the surface thereof is undesirable in that it makes such soil highly susceptible to erosion by rain or wind. Attempts have therefore been made to cultivate the soil in a horizontal plane some short distance below the surface of the ground, leaving the surface earth intact insofar as possible. It has been extremely difficult, however, with tools of the prior art to achieve this end result to any satisfactory degree.

The method and device of this invention provide means for cultivating the earth in a horizontal plane a short distance below the surface by means of sonic energy without significantly disturbing the surface soil.

This improved end result is achieved in the method and device of this invention by utilizing a substantially flat blade member, the broad surfaces of which are oriented horizontally, such blade member being supported by means of relatively flat arm members which extend through the surface of the soil. Means are provided for sonically elastically vibrating the blade member, preferably as part of a resonantly vibrating system. While the blade member is being sonically excited, it is drawn horizontally through the earth to fluidize a swath of earth a short distance below the surface without significantly tilling the earthen material at and immediately adjacent to the surface.

The blade member not only acts to cultivate the subsurface soil but also cuts off the roots of weeds and/or stubble, leaving the upper structure of such growth in the ground intact. This plant matter is not only effective in erosion control but also provides organic matter to enrich the soil. The weeds and stubble material are thus effectively killed with their upper portions being left in the soil for the useful purposes indicated. The device and method of this invention thus provides means for cultivating soil immediately below the surface thereof without disturbing the surface regions except for relatively minor slots made by the arms which support the blade.

It is therefore an object of this invention to provide an improved method and apparatus for subsurface cultivating without substantially disturbing the surface soil.

It is another object of this invention to facilitate erosion control in soil cultivation.

It is still another object of this invention to provide means for utilizing sonic energy to cultivate subsurface soil without significantly affecting the surface portions thereof.

It is still another object of this invention to provide means for subsurface cultivation whereby weeds and stubble are killed with their upper parts being left intact for erosion control and soil enrichment.

Other objects of this invention will become apparent from the following description taken in connection with the accompanying drawings, of which:

FIG. 1 is a perspective view illustrating a preferred embodiment of the device of the invention, FIG. 2 is an end elevation view of the embodiment shown in FIG. 1, FIG. 3 is a cross sectional view taken along the plane indicated by 3—3 in FIG. 2, FIG. 4 is a side elevational view of the embodiment of FIG. 1, FIG. 5 is a cross sectional view taken along the plane indicated by 5—5 in FIG. 3, FIG. 6 is a schematic drawing illustrating the standing wave pattern set up in the device of the invention by virtue of the resonant vibration thereof, and FIG. 7 is a side elevation view illustrating the preferred embodiment of the device of the invention being drawn through the earth.

It has been found most helpful in analyzing the operation of the device of this invention to analogize the acoustically vibrating circuit involved to an equivalent electrical circuit. This sort of approach to analysis is well known to those skilled in the art and is described, for example, in Chapter 2 of Sonics, by Hueter and Bolt, published in 1955 by John Wiley and Sons. In making such an analogy, force, F, is equated with electrical voltage, E; velocity of vibration, $u$, is equated with electrical current, $i$; mechanical compliance, $C_m$, is equated with electrical capacitance, $C_e$; mass, M, is equated with electrical inductance, L; mechanical resistance (friction), $R_m$, is equated with electrical resistance, R; and mechanical impedance, $Z_m$, is equated with electrical impedance, $Z_e$.

Thus, it can be shown that if a member is elastically vibrated by means of an acoustical sinusoidal force, $F_o \sin \omega t$, ($\omega$ being equal to $2\pi$ times the frequency of vibration), that $$Z_m = R_m + j\left(\omega M - \frac{1}{\omega C_m}\right) = \frac{F_o \sin \omega t}{u} \quad (1)$$

Where $\omega M$ is equal to $1/\omega C_m$, a resonant condition exists, and the effective mechanical impedance, $Z_m$, is equal to the mechanical resistance, $R_m$, the reactive impedance components $\omega M$ and $1/\omega C_m$ cancelling each other out. Under such a resonant condition, velocity of vibration, $u$, is at a maximum, power factor is unity, and energy is most efficiently delivered to a load to which the resonant system may be coupled.

It is to be noted that in the device of this invention the mass and compliance for forming the resonantly vibrating system are furnished by the structural members of such system themselves such that the earthen formation is not incorporated as a reactance in such system. The earth under such conditions acts as a resistive impedance load which provides no significant reactive components. This employment of apparatus resonance results in a random vibration of the earthen particles, rather than a lumped coherent vibration such as results from non-resonant vibrating apparatus, with a considerable relative motion occurring between the separate grains. It is believed that each of the individual irregular grains when energized by the sonic energy in this sonic resonant fashion separately vibrates in a random path with a relatively fixed radius of vibration which changes in direction but remains fixed in magnitude. Such random vibration effectively separates the particles so that they do not adhere to each other. The net result is a uniquely high degree of fluidization of the earthern structure.

It is also important to note the significance of the attainment of high acoustical "Q" in the resonant system being driven, to increase the efficiency of the vibration thereof and to provide a maximum amount of energy for the cultivating operation. As for an equivalent electrical circuit, the "Q" of an acoustically vibrating circuit is defined as the sharpness of resonance thereof and is indicative of the ratio of the energy stored in each vibration cycle to the energy used in each such cycle. "Q" is mathematically equated to the ratio between $\omega M$ and $R_m$. Thus, the effective "Q" of the vibrating circuit can be maximized to make for highly efficient, high amplitude vibration by minimizing the effect of friction in the circuit and/or maximizing the effect of mass in such circuit.

In considering the significance of the parameters decribed in connection with Equation 1, it should be kept in mind that the total effective resistance, mass, and compliance in the acoustically vibrating circuit are represented in the equation and that these parameters may be distributed throughout the system rather than being lumped in any one component or portion thereof.

It is also to be noted that an orbiting mass oscillator may be utilized in the device of the invention that automatically adjusts its output frequency to maintain resonance with changes in the characteristics of the load. Thus, in the face of changes in the effective mass and compliance presented by the load, the system automatically is maintained in optimum resonant operation by virtue of the "lock in" characteristics of applicant's unique orbiting mass oscillator. The vibrational output from such an orbiting mass oscillator is generated along a controlled predetermined coherent path to provide maximum output along a desired axis or axes. The orbiting mass oscillator automatically changes not only its frequency but its phase angle and therefore its power factor with changes in the impedance load to assure optimum efficiency of operation at all times.

Referring now to FIG. 1, a preferred embodiment of the device of the invention is illustrated. Substantially flat terrafoil or blade member 11 is supported from bar member 12 by means of flat arm members 14 and 15. The broad surfaces of blade member 11 and bar member 12 are substantially parallel to each other and in the operation of the device are oriented in substantially horizontal planes. The broad surfaces of arm members 14 and 15 are oriented substantially parallel to each other and normal to the broad surfaces of the bar and blade members.

Platform 17 is supported on bar member 12 by means of post members 20 and 21, which are supported on bar member 12 by means of sleeve bearings 23 and 24 formed in the bar member (see FIG. 4). Blade member 11, arm members 14 and 15, bar member 12, post members 20 and 21 and platform member 17 are all preferably fabricated of an elastic material such as an elastic steel. Mounted on platform member 17 is gasoline engine 22, the drive shaft 22a of which rotatably drives pulley 26. The drive shaft housing 32 of oscillator unit 30 is attached to platform 17 by welding or any other suitable means.

Referring now additionally to FIGS. 2 and 3, input coupler 31 of oscillator unit 30 is mounted in housing 32 for rotation on ball bearings 33 and 34 which are attached to the housing. Pulley 35 is attached to the end of coupler 31 and is rotatably driven by means of drive belt 38 which couples pulley 35 to pulley 26. Oscillator unit 30 comprises an orbiting mass oscillator of the type described in connection with FIGS. 21-23 of my Patent No. 2,960,314, issued Nov. 15, 1960. This oscillator comprises a cylindrical rotor member 40 which is driven around a race 41 formed by the inner surfaces of housing 42. Rotor 40 is connected to coupler 31 by means of flexible shaft 45 and ball member 46 which is fixedly attached to the end of the shaft and forms a universal joint with the U-shaped end of coupler 31. Housing 42 is attached to bar member 12 by means of bolts 50.

When rotor 40 is rotatably driven by shaft 45, sonic elastic vibrations are set up in bar 12 at a frequency which is a function of the rotation speed of the rotor. Such vibrations take a generally sinusoidal pattern and generate elastic vibrational components along the longitudinal and transverse axes of bar 12. The rotation speed of rotor 40 is preferably adjusted to generate vibrations at a frequency such as to cause resonant vibration of the system including bar member 12 and blade member 11, so as to set up standing wave patterns 52 and 51 in the bar and blade members respectively, as indicated in FIG. 6. A resonant system is thereby formed in the apparatus itself, the frequency of which is largely independent of the load provided by the soil during the cultivating operation. It is to be noted that the orbiting mass oscillator once having been set for resonant vibration of the system tends to lock in with the system to maintain such resonant operation in the face of vibrations in impedance characteristics due to changes in load conditions, etc.

Referring now to FIG. 7, the manner of operation of the invention is illustrated. Blade member 11 is worked into the ground with its broad surfaces substantially parallel to the surface of the earth at the desired cultivating depth. Draw bar 55 is connected to platform 17. Draw bar 55 is supported on wheel member 56 and is attached to a suitable device, such as a tractor, for drawing blade 11 parallel to the soil surface 62 in the direction indicated by arrow 60. As blade member 11 is drawn through the soil the sonic energy radiated thereby fluidizes the soil particles in the immediate areas 61 through which it passes but has substantially no effect on the soil 62 in the surface regions. The surface area is only broken by the sonic energy radiated by arms 14 and 15 which results in the formation of but relatively minor slots in the earth.

Thus, by means of the technique of this invention, highly efficient sub-surface cultivation can be accomplished without significantly disturbing the earth in the immediate surface regions. This greatly facilitates the control of surface erosion and enables effective weeding and termination of stubble growth, leaving the organic material of such growth for aid in erosion control and for enriching the soil.

While this invention has been described and illustrated in detail, it is to be clearly understood that this is intended by way of illustration and example only and is not to be taken by way of limitation, the spirit and scope of this invention being limited only by the terms of the following claims.

I claim:

1. A sonic subsurface soil cultivator for fluidizing the soil a short distance below the surface thereof while leaving the surface soil substantially intact comprising a substantially flat blade member having a pair of opposite broad surfaces, a bar member having a pair of opposite broad surfaces, arm means for joining said bar member to said blade member, sonic vibration means connected to said bar member for resonantly elastically vibrating said bar member and said blade member at a sonic frequency, said bar and blade members forming a resonant vibration system, and means for drawing said blade member horizontally through the soil with said blade member said short distance below the surface of the soil and said bar member above the surface of the soil the broad surfaces of said blade member being oriented substantially parallel to said soil surface.

2. The device as recited in claim 1 wherein said bar member and said blade member are spaced by said arm means with the broad surfaces of said members in substantially parallel relationship.

3. The device as recited in claim 2 wherein said arm menas comprises a pair of substantially flat arm members, the broad surfaces of said arm members being positioned opposite each other in substantially parallel relationship to each other and normal to the broad surfaces of bar and blade members.

4. The device as recited in claim 1 wherein said sonic vibration means comprises an orbiting mass oscillator and motor means for rotatably driving said oscillator and additionally including platform means mounted on said bar member for supporting said motor means.

5. The device as recited in claim 4 and additionally including means for tightly securing said oscillator to said bar member.

6. The device as recited in claim 1 wherein said means for drawing said blade member through the soil comprises a draw bar attached to said bar member and a wheel member mounted for rotation on said draw bar for supporting said draw bar when said wheel member is drawn along the soil surface.

7. The device as recited in claim 3 wherein broad surfaces of said arm members are oriented in planes normal to the direction in which said blade member is drawn by said drawing means.

8. A method for cultivating soil a short distance below the surface while leaving the surface soil substantially intact comprising the steps of placing a substantially flat blade in the soil with its broad surfaces substantially parallel to the soil surface and at said short distance therebelow, said blade being supported from the surface, elastically sonically vibrating said blade at a frequency such as to cause resonant vibration thereof, and while said blade is being vibrated, drawing said blade horizontally through the soil.

References Cited

UNITED STATES PATENTS

| 2,960,314 | 11/1960 | Bodine | 165—1 |
| 3,048,229 | 8/1962 | Simpson | 172—698 |

FOREIGN PATENTS

| 2,219 | 1/1914 | Great Britian. |

ANTONIO F. GUIDA, Primary Examiner

J. W. PETERSON, Assistant Examiner

U.S. Cl. X.R.

172—40